United States Patent [19]

Bradley

[11] Patent Number: 4,883,313

[45] Date of Patent: Nov. 28, 1989

[54] VEHICLE SUNROOF

[75] Inventor: Dennis Bradley, Stafford, England

[73] Assignee: Arrowin Limited, England

[21] Appl. No.: 232,699

[22] Filed: Aug. 16, 1988

[30] Foreign Application Priority Data

Feb. 10, 1988 [GB] United Kingdom ................ 8803067

[51] Int. Cl.$^4$ .............................................. B60J 7/04
[52] U.S. Cl. ...................................... 296/216; 296/220
[58] Field of Search ........................ 296/216, 218, 220

[56] References Cited

U.S. PATENT DOCUMENTS 3,993,348 11/1976 Pizzuti ................................. 296/222
4,533,173 8/1985 Davis et al. .......................... 296/216

FOREIGN PATENT DOCUMENTS 0253632 1/1988 European Pat. Off. ............. 296/216
2053086 6/1979 Fed. Rep. of Germany ...... 296/216
2472705 7/1981 France ................................ 296/216

Primary Examiner—Dennis H. Pedder
Attorney, Agent, or Firm—Andrus, Sceales, Starke & Sawall

[57] ABSTRACT

A vehicle sunroof 1 comprises a frame 2 for mounting in a vehicle roof 16 and a slidable panel 5 supported in the frame 2 between a pair of elongate side support members 11 which are arranged to allow rearwards sliding of the panel 5 to a cantilevered open position. The side support frame members 11 each having a rearwards extension which is cantilevered from the frame 2 to extend over the vehicle roof 16 and which is free from direct attachment to the vehicle roof. Preferably, the side support frame members 11 extend beyond the frame 2 by a distance less than about 30% of the distance between the front 3 and rear 4 edges of the frame.

7 Claims, 1 Drawing Sheet

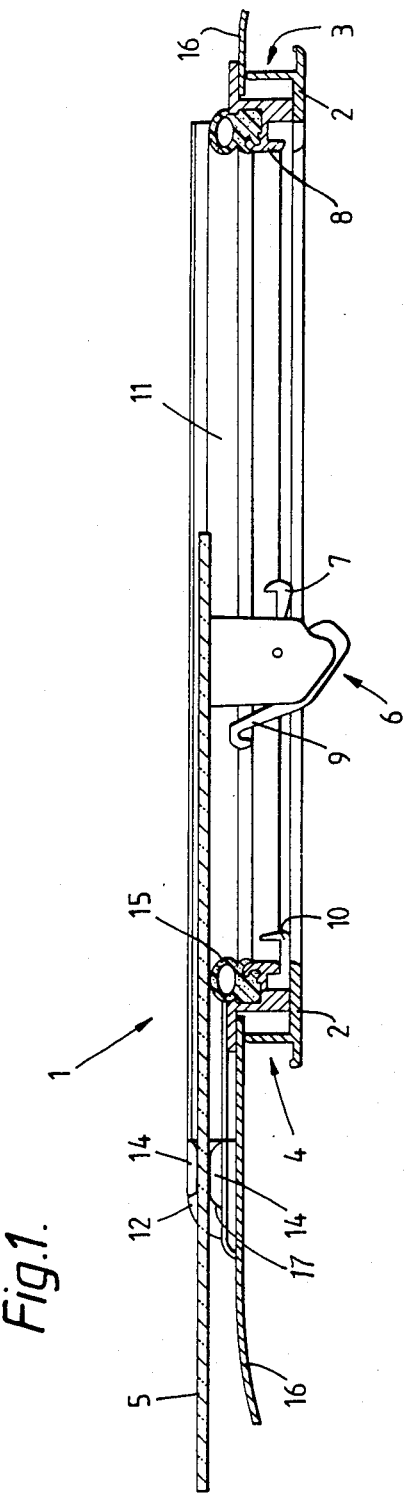
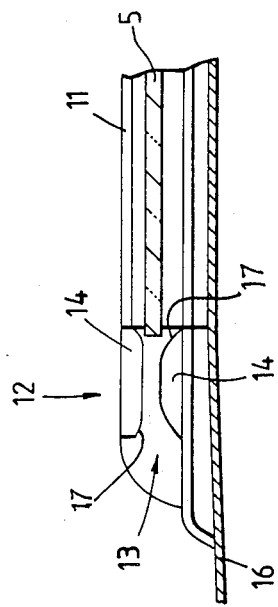
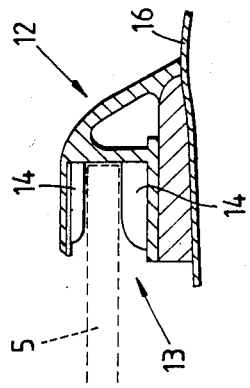

VEHICLE SUNROOF

DESCRIPTION

The present invention relates to vehicle sunroofs and, more particularly, to sunroofs of the slide-only type. Sunroof panels of the slide type are often fitted to a vehicle roof by mounting between two side support members or rails.

In the prior art, the rails extend along the vehicle roof and are substantially twice the length of the panel in the direction of travel of the panel, each rail being fitted at its rearward end with an end cap which prevents movement of the panel beyond the extent of the rails.

There are several disadvantages with this type of sunroof. Firstly, the sunroof is difficult to install since the rails must be riveted to the car roof in addition to being welded to the top frame of the sunroof. Secondly, a car roof is curved from front to rear and this curvature can cause sliding of the panel rearwards and forwards to be very difficult indeed since the panel will wedge or jam in the rails. Thirdly, the long rails along the length of the car roof are unsightly.

According to a first aspect of the present invention, therefore, there is provided in combination a vehicle and a sunroof; said sunroof comprising a frame, said frame mounted in a roof of said vehicle and having a pair of fixed elongate side support members and a slidable panel; and panel being supported in said side members of said frame, said side members being adapted to allow rearwards sliding of said panel; each of said side support members having a rearwards extension, said extensions each being cantilevered from said frame thereby to extend over said vehicle roof and being free from direct attachment to said vehicle roof.

Preferably, the extension is about 10% of the length between the front and rear of the frame in order to restrict vibration, bending and subsequent deformation resulting from wind pressure when it is in the open position.

According to a second aspect of the present invention a vehicle sunroof comprises a frame, said frame having a front and a rear edge and being mountable in a roof of a vehicle; a pair of fixed elongate side support members; and a slidable panel, said panel being supported in said side members of said frame, said side members being adapted to allow rearwards sliding of said panel; each of said side support frame members extending beyond said rear edge of said frame by a distance less than about 30% of the distance between said front and rear edges of said frame.

Also preferably, each side support member is fitted with an end piece shaped so as to allow the panel to be slidably supported in it as it is slid rearwards through it.

Rearward movement of the panel is preferably restricted by the engagement of a handle assembly, attached to or forming part of the panel, with the rear edge of the frame.

One example of a sunroof constructed in accordance with the present invention will now be described with reference to the accompanying drawings, in which:

FIG. 1 shows in longitudinal section a sunroof in the partially opened position;

FIG. 2 is a section through an end piece looking along the direction of travel of the panel; and, FIG. 3 is a side view of an end piece.

The vehicle sunroof 1 has a frame 2 with a front 3 and a rear 4. In the frame 2 is mounted a glass panel 5 to which is attached a latching handle assembly 6 (which may be of the type described in our copending British application number 8701944). The latching handle 6 has a first latching portion 7 which forms a latch for engagement with a front latch abutment 8 (mounted centrally of the front portion 3 of the frame) when the glass panel 5 is in its forward, closed position. Similarly, a second latch portion 9 forms a rear latch for engaging a rear abutment 10 (mounted centrally of the rear portion 4 of the frame) when the glass panel 5 is in its rearward, open position.

Each side of the frame includes an integral side support member or rail 11, at the rearward end of which is mounted an end piece 12.

As is customary, the rails 11 are arranged so as to allow the glass panel 5 to be slid in rearward and forward directions in order to open and close the sunroof and the inner channel of each rail 11 along which the glass panel slides is fitted with flock coated rubber extrusion. The rails 11 extend beyond the rear edge 4 of the frame 2 by a distance equal to about 10% of the distance between the front 3 and rear 4 edges of the frame; in any case, it is preferred that they should extend by at most about 30% of that distance beyond the rear edge of the frame.

Each end piece 12 is shaped with a tapered recess 13 to allow the glass panel 5 to slide through it. This allows the glass panel to be slid rearwards and to project beyond the of the rails 11 and end pieces 12. Preferably, each end piece is provided with guide members 14 having tapered ends 17 which form the tapered recess 13 for the glass panel 5 to slide through. When the glass panel is in the withdrawn, open position, it is supported by a bubble seal 15, used to seal the panel in its closed position and attached to the rear 4 of the frame 2, and by the guide members 14. This combination of supporting members, distanced as described above, enable unwanted vibration of the glass panel when in the open position to be damped.

The present invention has the advantage of being able to be pre-assembled and fitted to a car roof 16 without the requirement of riveting the rails 11 to the car roof 16, thus allowing the sunroof to be more easily installed than is possible with the prior art. Additionally, jam free sliding of the glass panel 5 rearwards and forwards is ensured since the sunroof is unaffected by the degree of curvature of the car roof 16, the curvature being shown in FIG. 1. An aesthetic advantage is that the requirement for long unsightly rails for mounting the panel is removed.

I claim:

1. In combination, a vehicle and a sunroof; said sunroof comprising:

a frame, said frame being mounted in a roof aperture of said vehicle and having a pair of fixed elongate side support members; and a slidable panel, said panel supported in said side support members of said frame and said side support members being adapted to allow rearwards sliding of said panel;

each of said side support members having an extension rearwardly of said aperture, said extension having a rear opening, said extensions each extending over said vehicle roof, wherein said panel is adapted to slide to an open position cantilevered from said rear openings above the roof.

2. A vehicle and sunroof according to claim 1, wherein said frame has a front and a rear edge and said extension is in the range of substantially 10% to 30% of the distance between said front and rear edge.

3. A combination according to claim 1, wherein said side support members each have an end piece shaped so as to support said panel when it slides rearwards.

4. A combination according to claim 3, wherein said end piece has a tapered recess, said panel being slidable through said recess.

5. A vehicle sunroof comprising:
- a frame, said frame being mountable in a roof aperture of a vehicle and having a front and a rear edge and a pair of fixed elongate side support members; and
- a slidable panel, said panel being supported in said side support members of said frame, said side support members being adapted to allow rearwards sliding of said panel;
- each of said side support members extending beyond said rear edge of said frame, said side support members each having a rear opening, and wherein said panel is adapted to slide to an open position cantilevered from said rear openings.

6. A vehicle sunroof according to claim 5, wherein said side support members each have an end piece shaped so as to support said panel in said side support member when it slides rearwards beyond the end of said support member.

7. A vehicle sunroof according to claim 6, wherein said end piece has a tapered recess, said panel being slidable through said recess.

* * * * *